US012795381B2

(12) United States Patent
Coyle et al.

(10) Patent No.: US 12,795,381 B2
(45) Date of Patent: Nov. 10, 2026

(54) SYSTEMS AND METHODS FOR DYNAMICALLY DETERMINING ABNORMAL PERIODIC SIGNALS IN A NETWORK

(71) Applicant: Verizon Patent and Licensing Inc., Basking Ridge, NJ (US)

(72) Inventors: Timothy E. Coyle, Chicopee, MA (US); Hector A. Garcia Crespo, N Richland Hills, TX (US); Ammara Essa, Los Angeles, CA (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 419 days.

(21) Appl. No.: 18/492,331

(22) Filed: Oct. 23, 2023

(65) Prior Publication Data

US 2024/0048998 A1 Feb. 8, 2024

Related U.S. Application Data

(63) Continuation-in-part of application No. 17/652,806, filed on Feb. 28, 2022, now Pat. No. 12,052,060.

(51) Int. Cl.
*H04W 16/14* (2009.01)
*H04W 24/02* (2009.01)

(52) U.S. Cl.
CPC ........... *H04W 16/14* (2013.01); *H04W 24/02* (2013.01)

(58) Field of Classification Search
CPC ..... H04W 16/14; H04W 24/02; H04W 24/08; H04B 15/00
See application file for complete search history.

(56) References Cited

U.S. PATENT DOCUMENTS

| | | | | |
|---|---|---|---|---|
| 12,052,060 | B2 | 7/2024 | Coyle | |
| 2017/0070324 | A1* | 3/2017 | Kahtava | H04L 27/0006 |
| 2019/0312779 | A1 | 10/2019 | Magzimof | |
| 2022/0173849 | A1 | 6/2022 | Rahman | |
| 2023/0084904 | A1* | 3/2023 | Montalvo | G06F 30/27 370/329 |
| 2023/0196111 | A1* | 6/2023 | Alabbasi | G06N 3/09 455/414.1 |

FOREIGN PATENT DOCUMENTS

| | | |
|---|---|---|
| EP | 3432642 | 1/2019 |
| WO | 2021/026509 | 2/2021 |

* cited by examiner

*Primary Examiner* — Nizam U Ahmed

(57) ABSTRACT

A device may calculate a PRB seasonal strength based on PRB data from base stations, and may scale and normalize the PRB data based on the PRB seasonal strength. The device may calculate and combine FFTs for the normalized and scaled PRB data, may calculate a z-score for the combined FFT, and may calculate FFT IQRs for frequencies of the combined FFT. The device may filter the FFT IQRs based on the z-score, may process the FFT IQRs, with a clustering model, to identify clusters of periodic interference patterns, and may aggregate the clusters. The device may identify peak data in the PRB data, and may process the peak data, with a model, to determine a parameter for clustering. The device may process the PRB data, with the clustering model, to identify final clusters of periodic interference patterns, and may perform actions based on the final clusters.

20 Claims, 16 Drawing Sheets

SYSTEMS AND METHODS FOR DYNAMICALLY DETERMINING ABNORMAL PERIODIC SIGNALS IN A NETWORK

CROSS-REFERENCE TO RELATED APPLICATION

This patent application is a continuation-in-part (CIP) of prior U.S. patent application Ser. No. 17/652,806, filed on Feb. 28, 2022, and entitled "SYSTEMS AND METHODS FOR DETECTING AND MITIGATING PERIODIC AND TRANSIENT INTERFERENCE IN A NETWORK." The disclosure of the prior Application is considered part of and is incorporated by reference into this patent application.

BACKGROUND

Common types of interference in a cellular network (e.g., a radio access network (RAN)) are self-interference, multiple access interference, co-channel interference (CCI), and adjacent channel interference (ACI). Self-interference is induced by signals that are transmitted on a shared transmitter. Multiple access interference is induced by transmission from multiple radios using a same frequency resource. CCI occurs in links that re-use the same frequency channel. ACI is the interference induced between links that communicate in a same geographical location using neighboring frequency bands.

DETAILED DESCRIPTION OF EXAMPLE EMBODIMENTS

Figure 1A:
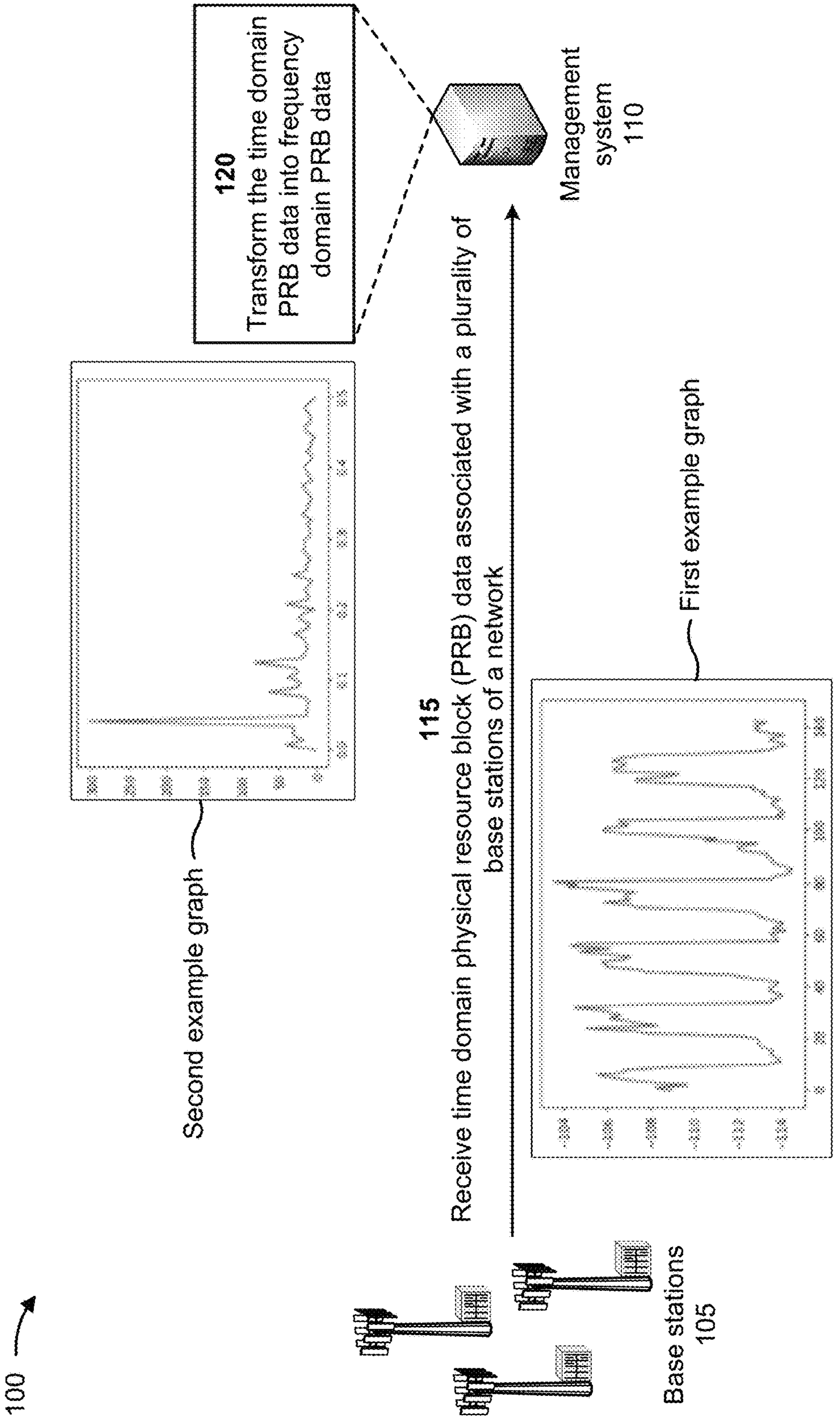
FIGS. 1A-1L are diagrams of an example associated with dynamically determining abnormal periodic signals in a network.

The following detailed description of example implementations refers to the accompanying drawings. The same reference numbers in different drawings may identify the same or similar elements.

Identifying and correcting interference issues in a network is a challenging but critical task. Network users (e.g., user equipment or UEs) near an interference source will experience degraded call success rates, increased dropped calls, poor voice quality, reduced data throughput, and/or the like. Detecting, locating, and ultimately eliminating sources of radio frequency (RF) interference is an essential strategy for service providers to ensure customer satisfaction. Some interference may be caused by a periodic interferer (e.g., periodic interference) or a transient interferer (e.g., transient interference). Periodic interference may include a narrow band signal that appears in the network at fixed time intervals. Transient interference may include a source of interference that moves through a network in a particular pattern. However, current techniques for detecting network interference are unable to detect periodic interference and transient interference.

Thus, current techniques for detecting network interference consume computing resources (e.g., processing resources, memory resources, communication resources, and/or the like), networking resources, and/or other resources associated with degrading call success rates for UEs based on periodic interference, increasing dropped calls for UEs based on periodic interference, providing poor voice quality for UEs based on periodic interference, providing reduced data throughput for UEs based on periodic interference, dispatching technicians to unsuccessfully identify and/or locate sources of periodic interference, and/or the like.

Some implementations described herein provide a management system that dynamically determines abnormal periodic signals in a network. For example, the management system may receive time domain physical resource block (PRB) data associated with a plurality of base stations of a network, and may transform the time domain PRB data into frequency domain PRB data. The management system may calculate a PRB seasonal strength based on the time domain PRB data, and may scale the time domain PRB data based on the PRB seasonal strength to generate scaled PRB data. The management system may normalize the scaled PRB data to generate normalized and scaled PRB data, and may calculate fast Fourier transforms (FFTs) for the normalized and scaled PRB data. The management system may combine the FFTs to generate a combined FFT, may calculate a z-score for the combined FFT, and may calculate FFT interquartile ranges (IQRs) for frequencies of the combined FFT. The management system may filter the FFT IQRs based on the z-score, and may process the FFT IQRs, with a clustering model, to identify clusters of periodic interference patterns. The management system may aggregate the clusters based on a time period and the frequency domain PRB data to generate aggregated clusters, and may identify peak data in the frequency domain PRB data based on the aggregated clusters. The management system may process the peak data, with a machine learning model, to determine a parameter for clustering, and may process the frequency domain PRB data, with the clustering model, to identify final clusters of periodic interference patterns based on the peak data and the parameter for clustering. The management system may perform one or more actions based on the final clusters.

In this way, the management system dynamically determines abnormal periodic signals in a network. For example, the management system may accurately detect abnormal periodic signals in uplink noise (e.g., PRB data) of a network. The management system may calculate a seasonal strength of the PRB data, may apply a filter to the PRB data, and may perform an FFT composite analysis of the PRB data. The management system may calculate an FFT z-score that enables outlier amplification of individual FFT periods, and may cluster FFT periods. The management system may detect peaks in the PRB data, may select a clustering parameter for the peaks, and may cluster the peaks based on the cluster parameter. Thus, the management system may conserve computing resources, networking resources, and/or other resources that would have otherwise been consumed by degrading call success rates for UEs based on periodic interference, increasing dropped calls for UEs based on periodic interference, providing poor voice quality for UEs based on periodic interference, providing reduced data throughput for UEs based on periodic interference, dispatching technicians to unsuccessfully identify and/or locate sources of periodic interference, and/or the like.

FIGS. 1A-1L are diagrams of an example 100 associated with dynamically determining abnormal periodic signals in a network. As shown in FIGS. 1A-1L, example 100 includes a plurality of base stations 105 associated with a management system 110. Further details of the base stations 105 and the management system 110 are provided elsewhere herein.

As shown in FIG. 1A, and by reference number 115, the management system 110 may receive time domain PRB data associated with a plurality of base stations 105 of a network. For example, each of the base stations 105 may generate PRB data in a time domain. One PRB may span twelve subcarriers, and each subcarrier may include a 15 kilohertz (kHz) spacing. Thus, one PRB may be 180 kHz in frequency and one slot long in time. A PRB is a smallest unit of resources that can be allocated to a user (e.g., a user equipment (UE)). In some implementations, the PRB data may include data identifying uplink noise levels associated with the base stations 105, geographical locations of the base stations 105, slices of a spectrum utilized by the base stations 105, strengths of signals in the spectrum generated by the base stations 105, and/or the like. FIG. 1A includes a first example graph depicting PRB data received from a base station 105, where the horizontal axis (x-axis) provides an index of the PRB data that can be associated with time.

The management system 110 may periodically receive the time domain PRB data from the base stations 105, may continuously receive the time domain PRB data from the base stations 105, may receive the time domain PRB data based on providing a request for the time domain PRB data to the base stations 105, and/or the like.

As further shown in FIG. 1A, and by reference number 120, the management system 110 may transform the time domain PRB data into frequency domain PRB data. For example, the management system 110 may apply a transform to the time domain PRB data in order to transform the time domain PRB data into the frequency domain PRB data. Transforming the time domain PRB data into the frequency domain PRB data may enable the management system 110 to search for frequencies with significant magnitude that would identify the PRB data as periodic. In some implementations, the management system 110 may apply an FFT to the time domain PRB data in order to transform the PRB data from the time domain into the frequency domain. FIG. 1A includes a second example graph depicting the PRB data of the first example graph after the management system 110 applies the FFT to the time domain PRB data (e.g., where the horizontal axis (x-axis) is associated with frequency).

Figure 1B:
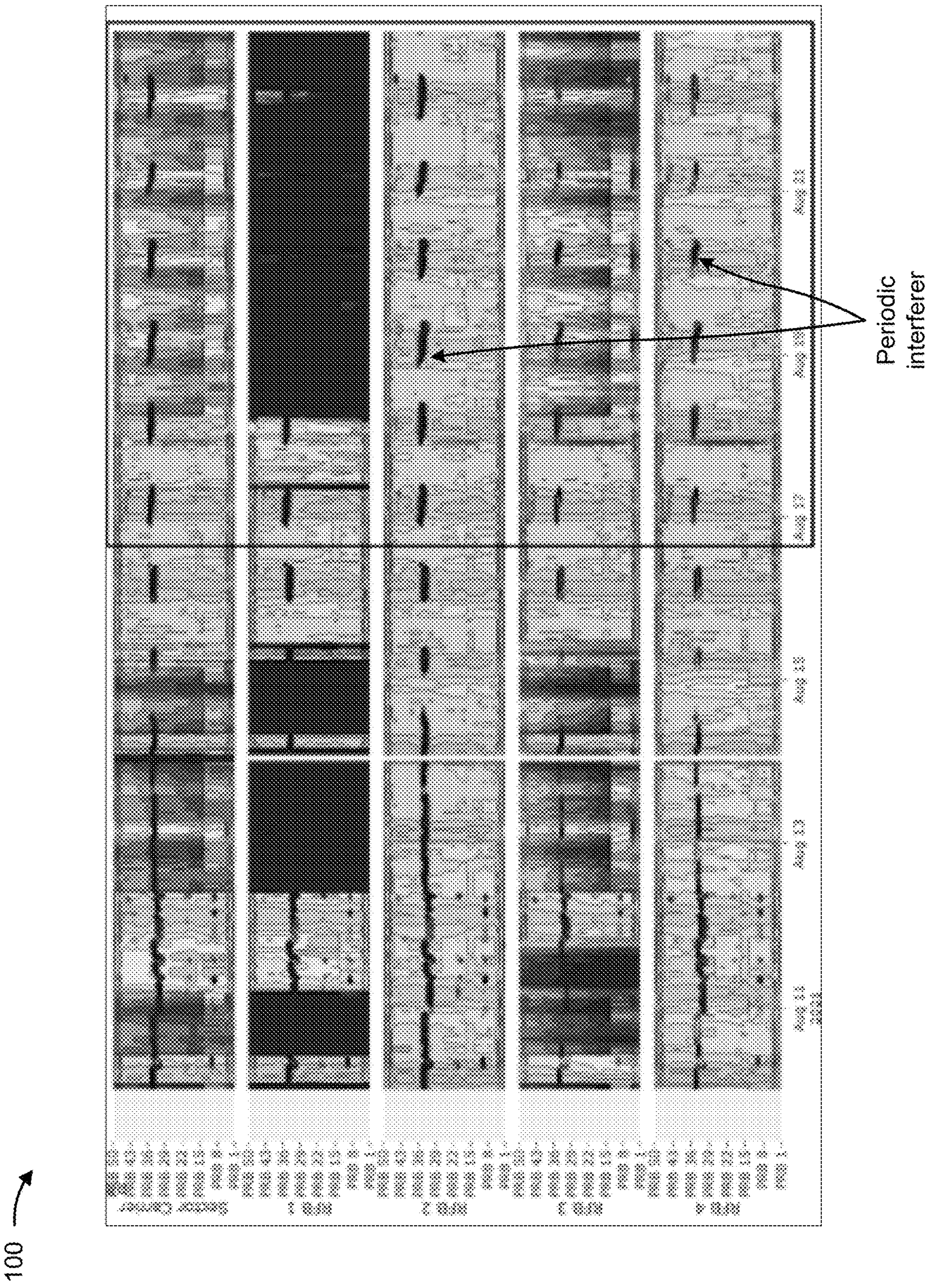

FIG. 1B depicts a heatmap image of the time domain PRB data received from one of the base stations 105 over time (e.g., ten or more days). As shown, there is likely to be a periodic narrow band interferer associated with PRB 36. The heatmap image shows that the periodic narrow band interferer is on all four branches of the base station 105, but is most clearly visible on branches two and four of the base station 105. The top portion of the heatmap image depicts a sector carrier average of the four branches of the base station 105. The sector carrier average shows that the periodic narrow band interferer is present even in aggregate.

Figure 1C:
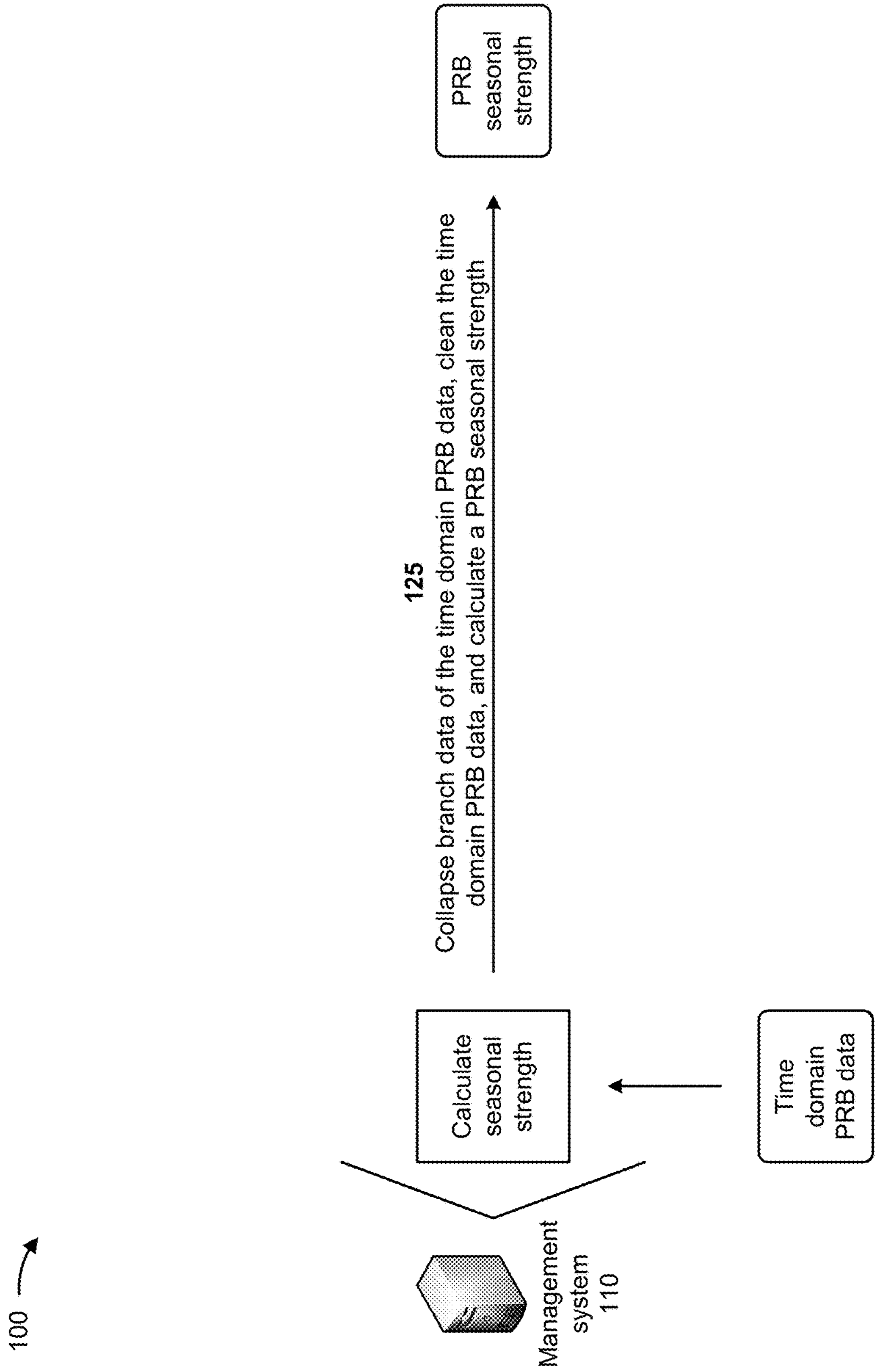

As shown in FIG. 1C, and by reference number 125, the management system 110 may collapse branch data of the time domain PRB data, may clean the time domain PRB data, and may calculate a PRB seasonal strength. For example, the base station 105 may include four branches (e.g., four antennas) generating PRB data in different directions. Thus, the time domain PRB data may include branch data associated with the four branches of the base station 105. In some implementations, the management system 110 may collapse or combine the branch data of the time domain PRB data.

In some implementations, the management system 110 may perform a data cleansing technique on the time domain PRB data to clean the time domain PRB data. For example, the data cleansing technique may remove incomplete data (e.g., missing data), remove noisy data (e.g., meaningless data), remove inconsistent data, and/or the like from the time domain PRB data. The data cleansing technique may include a data imputation technique, a data smoothing technique (e.g., a binning technique, a regression technique, an outlier analysis technique, etc.), and/or the like.

In some implementations, after collapsing the branch data of the time domain PRB data and cleaning the time domain PRB data, the management system 110 may calculate a PRB seasonal strength based on the time domain PRB data. For example, the management system 110 may utilize a time series decomposition to measure the PRB seasonal strength. A time series decomposition ($y_t$) may be written as:

$$y_t = T_t + S_t + R_t,$$

where $T_t$ is a smoothed trend component, $S_t$ is a seasonal component (e.g., the PRB seasonal strength), and $R_t$ is a remainder component. For strongly trended data, the seasonally adjusted data should have much more variation than the remainder component. Therefore, $\mathrm{Var}(R_t)/\mathrm{Var}(T_t+R_t)$ should be relatively small. But for data with little or no trend, the two variances should be approximately the same. The strength of the trend ($F_T$) may be defined as:

$$F_T = \max\left(0, 1 - \frac{\mathrm{Var}(R_t)}{\mathrm{Var}(T_t + R_t)}\right).$$

This may provide a measure of the strength of the trend between zero and one. Because a variance of the remainder may be larger than the variance of the seasonally adjusted data, a minimal possible value of $F_T$ may be set to zero. The strength of seasonality (e.g., the PRB seasonal strength) may be similarly defined, but with respect to detrended data rather than seasonally adjusted data:

$$F_S = \max\left(0, 1 - \frac{\mathrm{Var}(R_t)}{\mathrm{Var}(S_t + R_t)}\right).$$

A series with a seasonal strength $F_S$ close to zero may exhibit almost no seasonality, while a series with strong seasonality may include a seasonal strength $F_S$ close to one because $\mathrm{Var}(R_t)$ may be much smaller than $\mathrm{Var}(S_t+R_t)$.

Figure 1D:
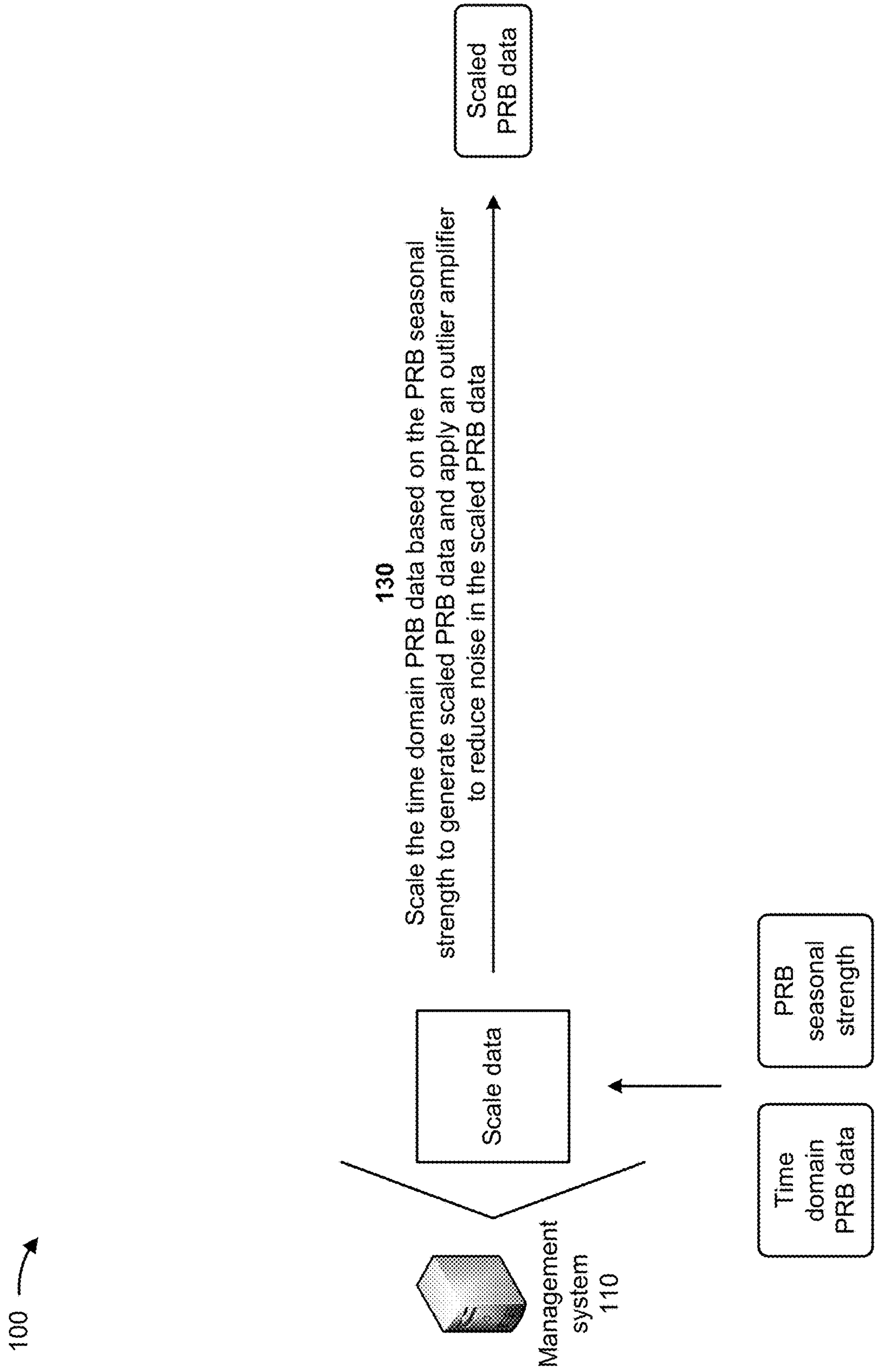

As shown in FIG. 1D, and by reference number 130, the management system 110 may scale the time domain PRB data based on the PRB seasonal strength to generate scaled PRB data and may apply an outlier amplifier to reduce noise in the scaled PRB data. For example, the management system 110 may utilize an IQR of the time domain PRB data and the PRB seasonal strength to scale the time domain PRB data. The time domain PRB data may include a distribution, and the management system 110 may order the distribution from low to high in four equal quartiles (e.g., a first quartile, a second quartile, a third quartile, and fourth quartile). The IQR of the time domain PRB data may include the second quartile and the third quartile (e.g., a middle half of the time domain PRB data). The management system 110 may multiply the IQR of the time domain PRB data and the PRB seasonal strength to generate results, and may add the results to the time domain PRB data to generate the scaled PRB data.

In some implementations, the management system 110 may apply an outlier amplifier to the scaled PRB data to reduce noise in the scaled PRB data. For example, if data of the scaled PRB data is an IQR outlier, the outlier amplifier may amplify the data. Alternatively, if data of the scaled PRB data is not an IQR outlier, the outlier amplifier may set an IQR floor for the data to reduce noise in the data.

Figure 1E:
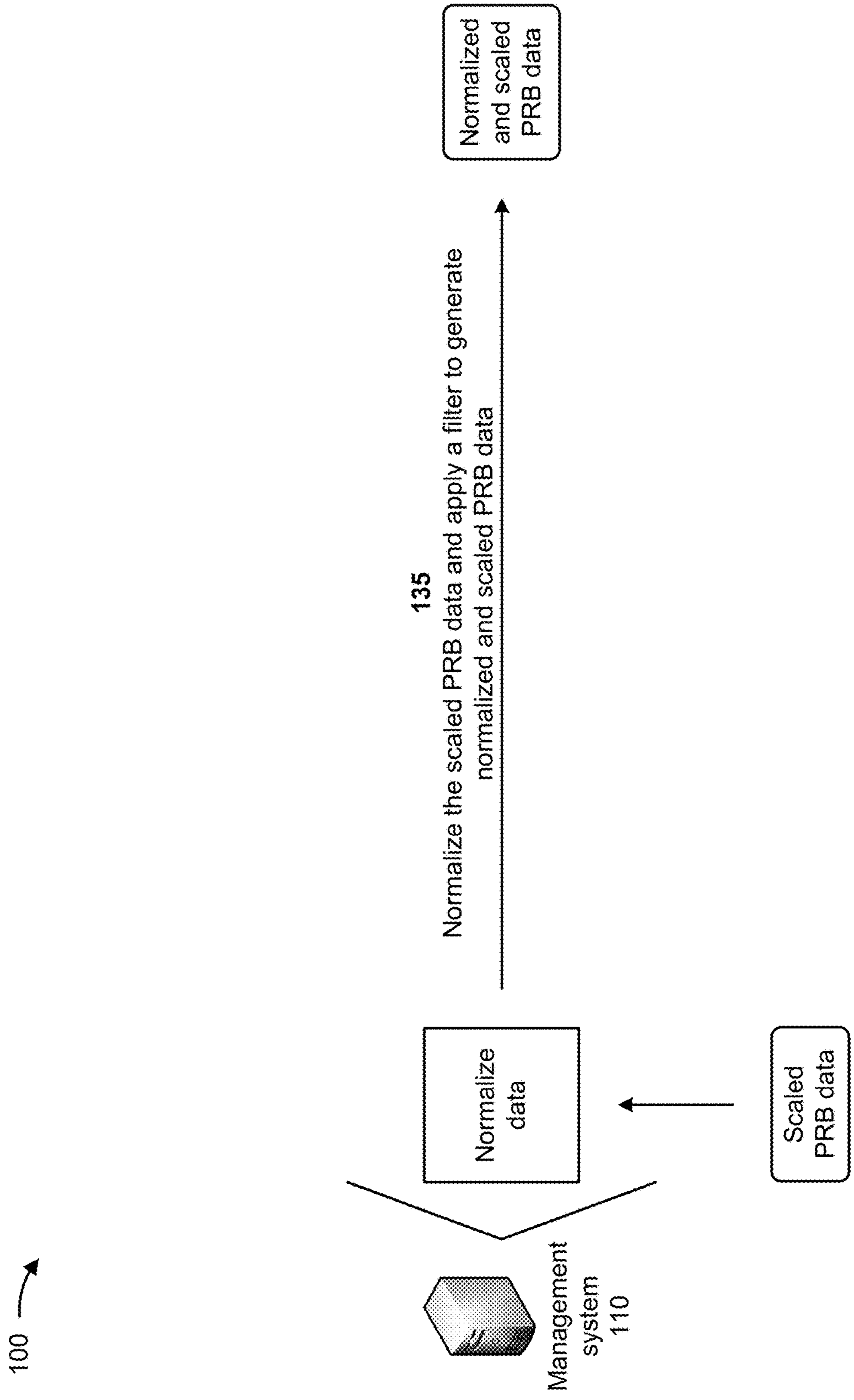

As shown in FIG. 1E, and by reference number 135, the management system 110 may normalize the scaled PRB data and may apply a filter (e.g., a Hann window filter or a Blackman window filter) to generate normalized and scaled PRB data. For example, the management system 110 may apply a normalization technique to the scaled PRB data to generate normalized and scaled PRB data. The normalization technique may include one or more of a scaling to a range technique, a clipping technique, a log scaling technique, a z-score technique, and/or the like. The scaling to a range technique may include converting floating-point feature values from a natural range (for example, 100 to 900) into a standard range (e.g., 0 to 1 or −1 to +1). The clipping technique may include capping values above (or below) a certain value to a fixed value (or values) (e.g., setting minimum and maximum values to avoid outliers). The log scaling technique may include calculating a log of values to compress a wide range of values to a narrow range of values. The z-score technique may include a variation of scaling that represents a quantity of standard deviations away from a mean. The management system 110 may calculate a z-score (x') of a point (x) as follows:

$$x' = (x - \mu)/\sigma,$$

where μ is the mean and σ is the standard deviation.

In some implementations, the management system 110 may apply filter (e.g., a Hann window filter or a Blackman window filter) to the normalized and scaled PRB data. The Hann window filter may include a window function for signal or image filtering using an FFT. The Hann window filter may include a three-term weighted average smoothing technique used for random signals and that provides good frequency resolution and leakage protection with fair amplitude accuracy. The Blackman window filter is a generalized cosine window filter.

Figure 1F:
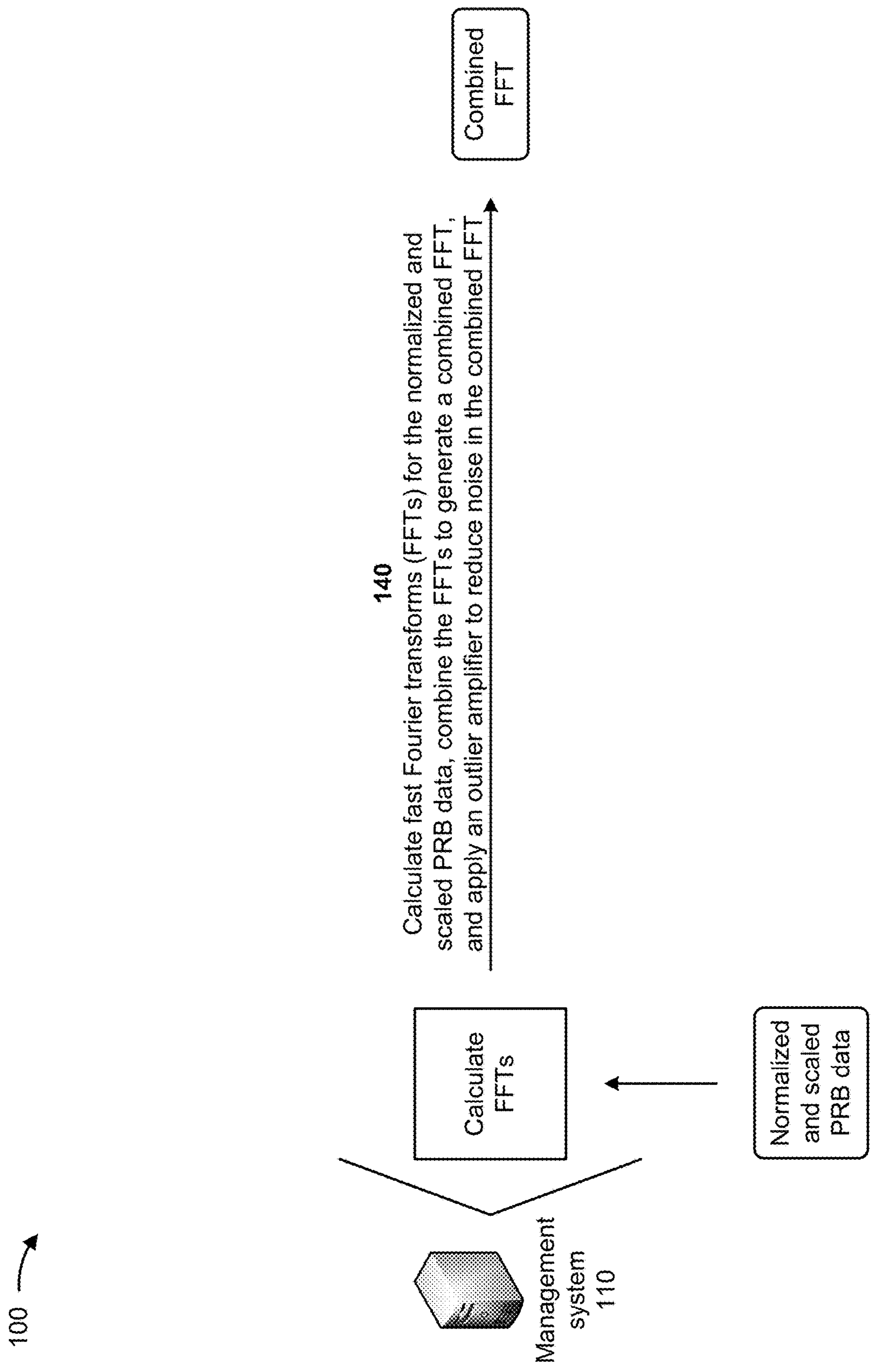

As shown in FIG. 1F, and by reference number 140, the management system 110 may calculate FFTs for the normalized and scaled PRB data to generate frequency domain PRB data, may combine the FFTs to generate a combined FFT, and may apply an outlier amplifier to reduce noise in the combined FFT. For example, the management system 110 may utilize the FFTs to transform the PRB data from time domain to the frequency domain. The management system 110 may calculate an FFT for each data point of the normalized and scaled PRB data to generate a plurality of FFTs. The FFT may convert a data point into individual spectral components and may thereby provide frequency information about the data point. The management system 110 may then combine the plurality of FFTs together to generate a combined FFT. In some implementations, the combined FFT may include a three-dimensional array representing the combination of the plurality of FFTs.

In some implementations, the management system 110 may apply an outlier amplifier to the combined FFT to reduce noise in the combined FFT. For example, if data of the combined FFT is an IQR outlier, the outlier amplifier may amplify the data. Alternatively, if data of the combined FFT is not an IQR outlier, the outlier amplifier may set an IQR floor for the data to reduce noise in the data.

Figure 1G:
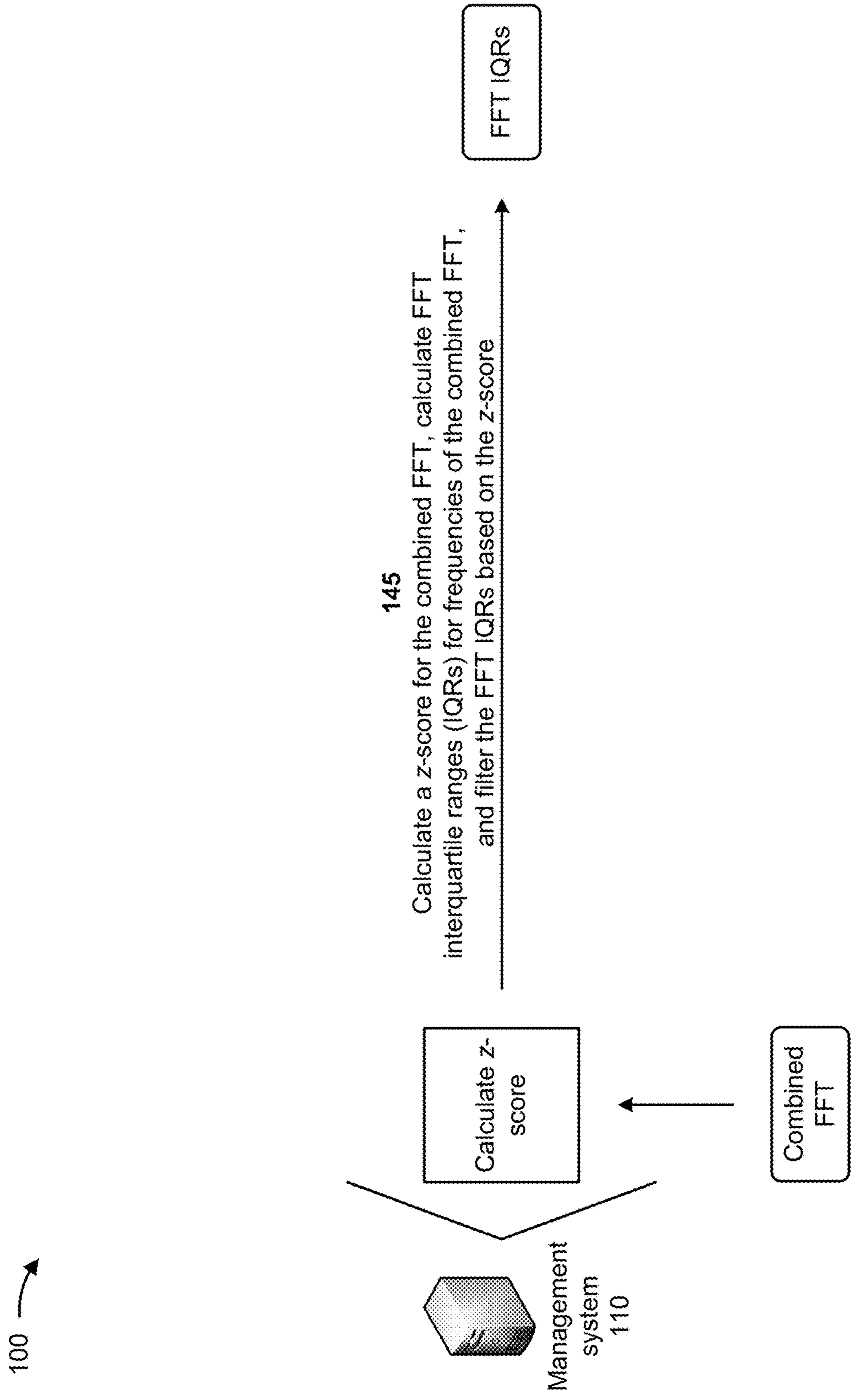

As shown in FIG. 1G, and by reference number 145, the management system 110 may calculate a z-score for the combined FFT, may calculate FFT IQRs for frequencies of the combined FFT, and may filter the FFT IQRs based on the z-score. For example, as described above, the z-score technique represents a quantity of standard deviations away from a mean. The management system 110 may calculate a z-score (x') of the combined FFT (x) as follows:

$$x' = (x - \mu)/\sigma,$$

where μ is the mean of the combined FFT and σ is the standard deviation of the combined FFT.

In some implementations, the management system 110 may calculate FFT IQRs for the frequencies of the combined FFT. The combined FFT may include a distribution, and the management system 110 may order the distribution from low to high in four equal quartiles (e.g., a first quartile, a second quartile, a third quartile, and fourth quartile). The FFT IQRs of the frequencies of the combined FFT may include the second quartile and the third quartile (e.g., a middle half of the combined FFT).

In some implementations, the management system 110 may utilize the z-score for the combined FFT to filter outliers from the FFT IQRs. For example, a z-score of 2.5 may indicate that a data point is 2.5 standard deviations away from the mean. The management system 110 may utilize a particular z-score (e.g., z-score=3) to identify outliers in the combined FFT. Therefore, any data point greater than or less than the particular z-score (e.g., a z-score greater than +3 or less than −3) may be considered as an outlier.

Figure 1H:
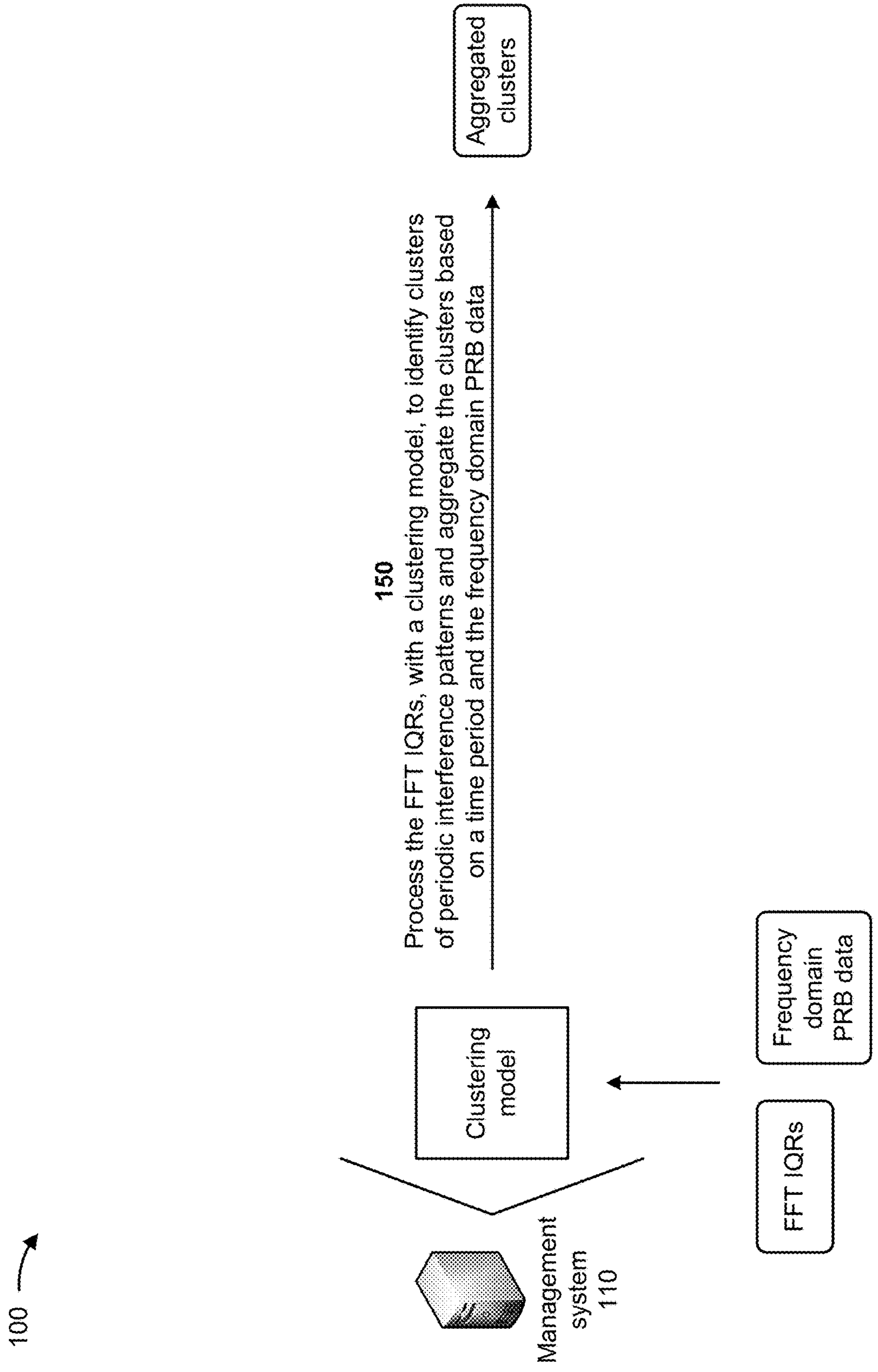

As shown in FIG. 1H, and by reference number 150, the management system 110 may process the FFT IQRs, with a clustering model, to identify clusters of periodic interference patterns and aggregate the clusters based on a time period and the frequency domain PRB data. For example, the management system 110 may apply the clustering model to the FFT IQRs to identify the clusters of periodic interference patterns. The clustering model may include an unsupervised or a supervised learning model that geographically clusters time bound groups of periodic interference patterns based on the FFT IQRs and the magnitudes associated with the periodic interference patterns. In some implementations, the management system 110 may utilize a k-nearest neighbors (KNN) model to cluster the periodic interference patterns based on similarities in a sorted dominant frequencies vector. For example, the management system 110 may select, from a vector, a quantity (e.g., "k") of dominant frequencies to consider (e.g., a quantity that may be tuned or changed based on a cell density of a location being analyzed). If the quantity is ten (k=10), the management system 110 may select the top ten frequencies and magnitudes from the vector, and may process the selected frequencies and magnitudes and frequency vectors of adjacent cell sites with the KNN model. After determining the KNNs, the management system 110 may determine that one or more of the cell sites (e.g., the base stations 105) have similar periodic interference patterns and hence are being affected by the same periodic interferer.

In some implementations, when processing the FFT IQRs, with the clustering model, to identify the clusters of periodic interference patterns, the management system 110 may process the FFT IQRs, with the k-nearest neighbor model, to determine neighboring periodic interference patterns, and may perform a cross-correlation of the neighboring periodic interference patterns to identify the clusters of periodic interference patterns.

In some implementations, the management system 110 may utilize a density-based spatial clustering of applications with noise (DBSCAN) clustering model to identify the clusters of periodic interference patterns based on the FFT IQRs. For example, the management system 110 may process the FFT IQRs, with the DBSCAN clustering model, to identify the clusters of periodic interference patterns based on FFT periods and PRB numbers associated with the FFT IQRs. In some implementations, when processing the FFT IQRs, with the clustering model, to identify the clusters of periodic interference patterns, the management system 110 may process the FFT IQRs, with the DBSCAN clustering model, to determine neighboring periodic interference patterns, and may perform a cross-correlation of the neighboring periodic interference patterns to identify the clusters of periodic interference patterns.

In some implementations, the management system 110 may aggregate the clusters based on the time period (e.g., one hour, two hours, and/or the like) and the frequency domain PRB data. For example, for each cluster, the management system 110 may aggregate the periodic interference patterns included in the cluster based on the time period and based on a median associated with the frequency domain PRB data. The aggregation of the clusters may enable the management system 110 to identify clusters with meaningful FFT periods.

Figure 1I:
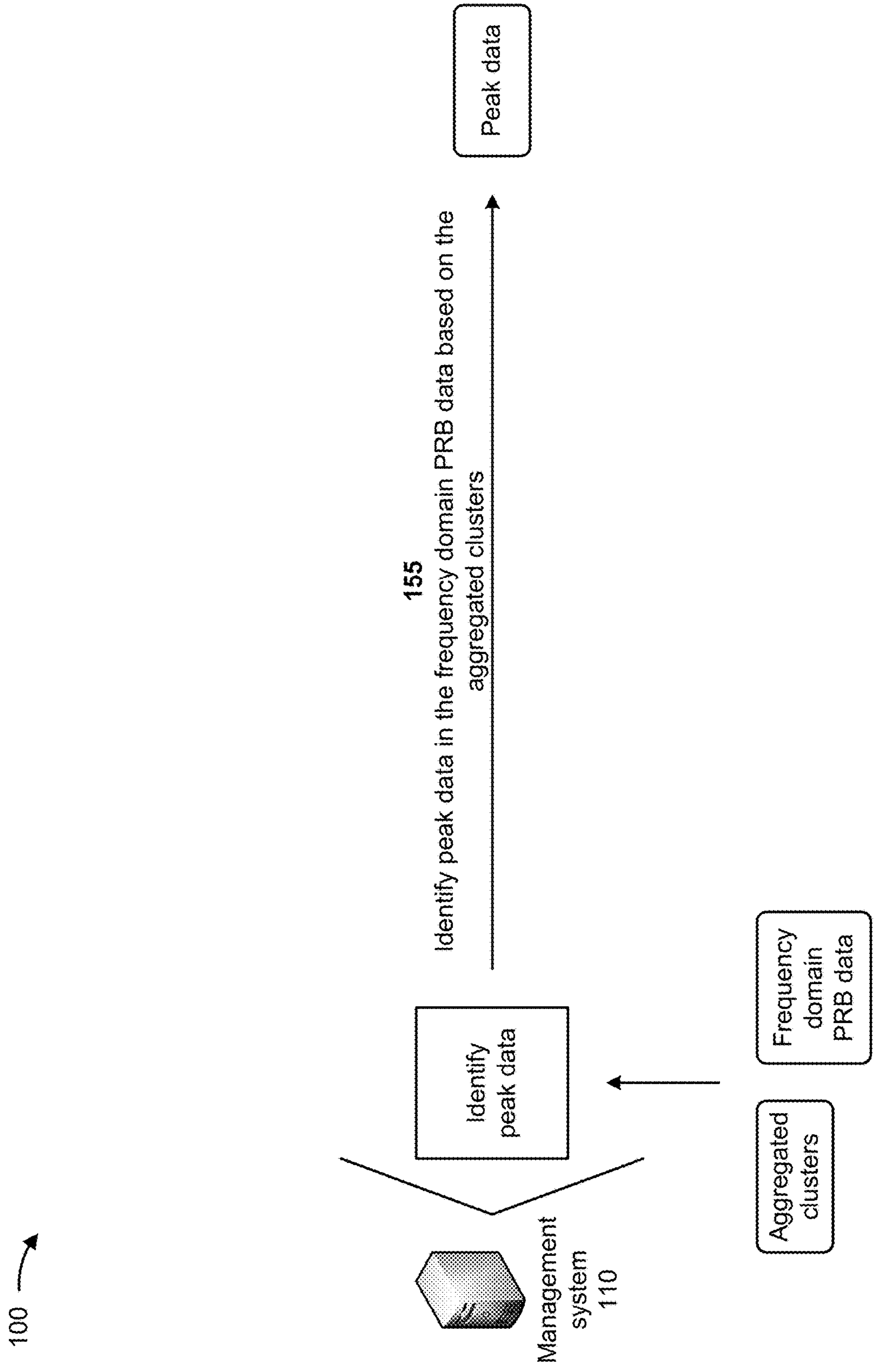

As shown in FIG. 1I, and by reference number 155, the management system 110 may identify peak data in the frequency domain PRB data based on the aggregated clusters. For example, the management system 110 may utilize a statistical technique to identify peaks in the frequency domain PRB data. In some implementations, for each of the aggregated clusters, the management system 110 may establish a threshold value, and may determine the frequency domain PRB data that is greater than the threshold value to be peak data. The peak data may include data in the frequency domain PRB data that is high point relative to other data in the frequency domain PRB data.

Figure 1J:
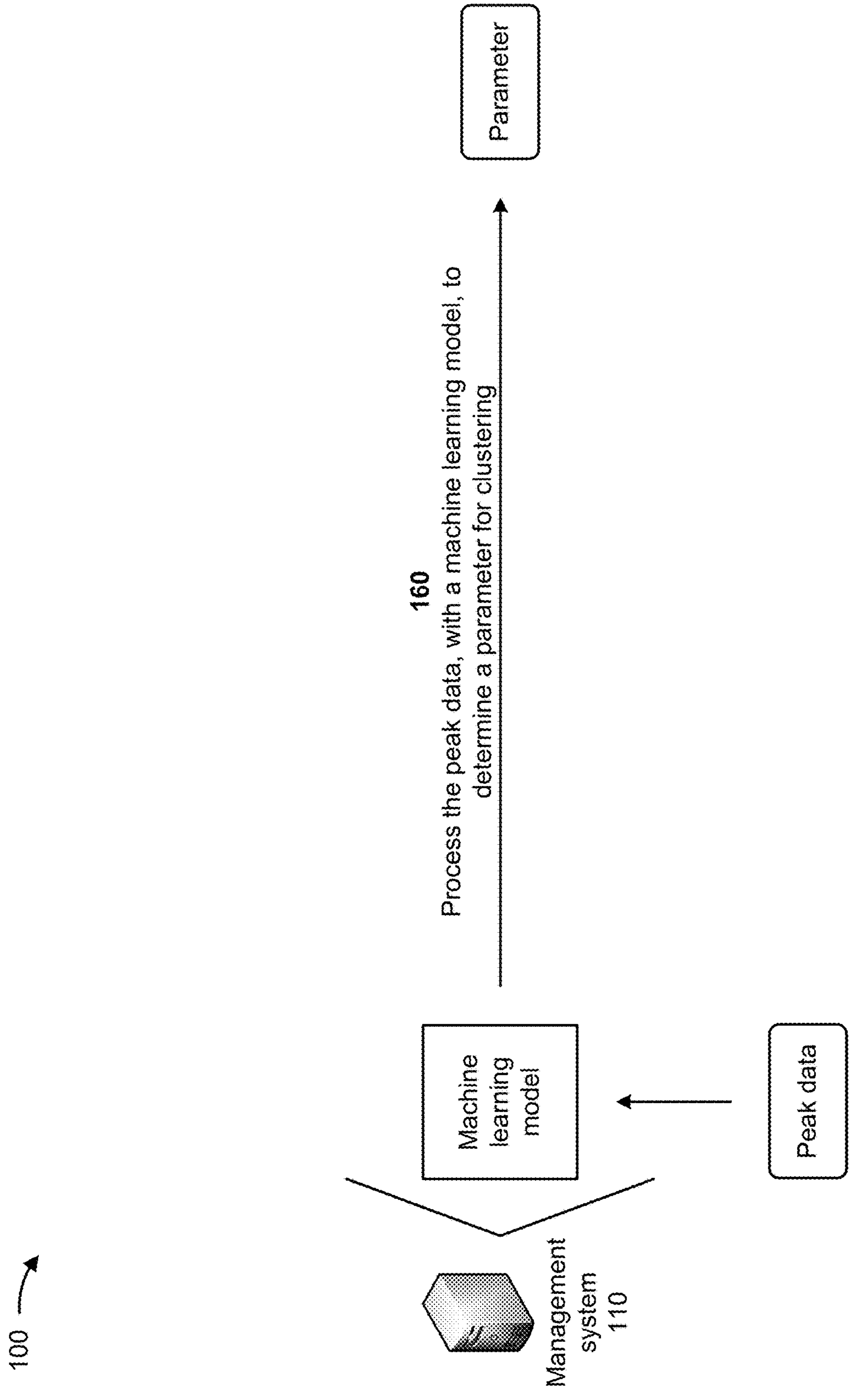

As shown in FIG. 1J, and by reference number 160, the management system 110 may process the peak data, with a machine learning model, to determine a parameter for clustering. For example, the clustering model (e.g., a DBSCAN clustering model) may be associated with a parameter (e.g., a hyperparameter) that is utilized to ensure that the DBSCAN clustering model achieves accurate results. The parameter may include a minimum samples parameter that identifies the fewest number of points required to form a cluster and/or an epsilon (E) parameter that identifies a maximum distance that two points can be from one another while still belonging to the same cluster. In some implementations, the management system 110 may process the peak data, with a machine learning model (e.g., a KNN model), to determine the parameter for the DBSCAN clustering model.

Figure 1K:
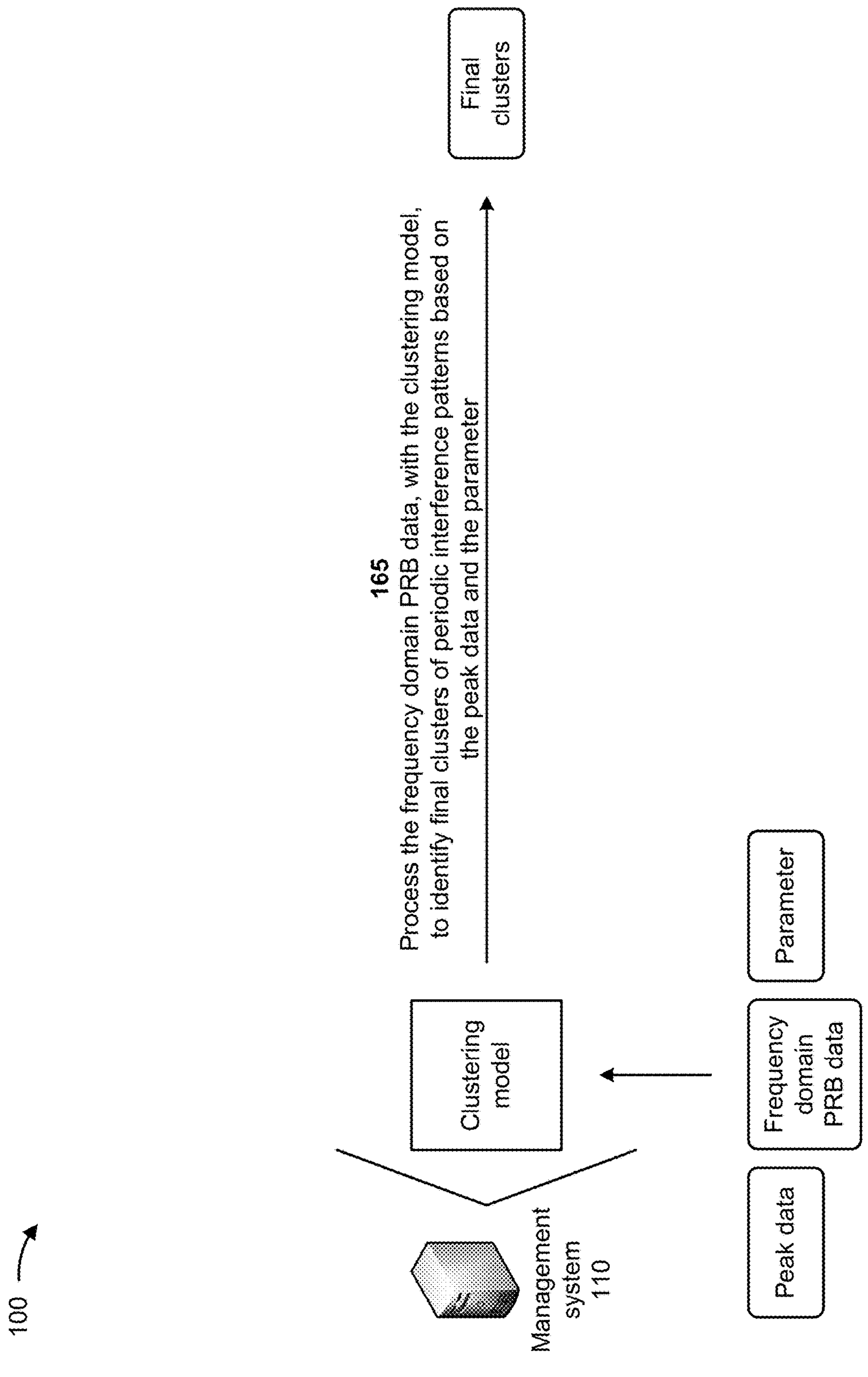

As shown in FIG. 1K, and by reference number 165, the management system 110 may process the frequency domain PRB data, with the clustering model, to identify final clusters of periodic interference patterns based on the peak data and the parameter. For example, the management system 110 may identify final clusters that represent a time domain summary of statistically relevant periodic data that is detected. The management system 110 may utilize the parameter with the clustering model (e.g., the DB SCAN clustering model) to ensure that the DBSCAN clustering model achieves accurate results. In some implementations, the management system 110 may process the frequency domain PRB data, with the DBSCAN clustering model (e.g., tailored with the parameter), to identify the final clusters of periodic interference patterns based on the peak data. In some implementations, when processing the frequency domain PRB data, with the clustering model, to identify the final clusters of periodic interference patterns, the management system 110 may process the frequency domain PRB data, with the DBSCAN clustering model, to determine neighboring periodic interference patterns, and may perform a cross-correlation of the neighboring periodic interference patterns to identify the final clusters of periodic interference patterns.

Figure 1L:
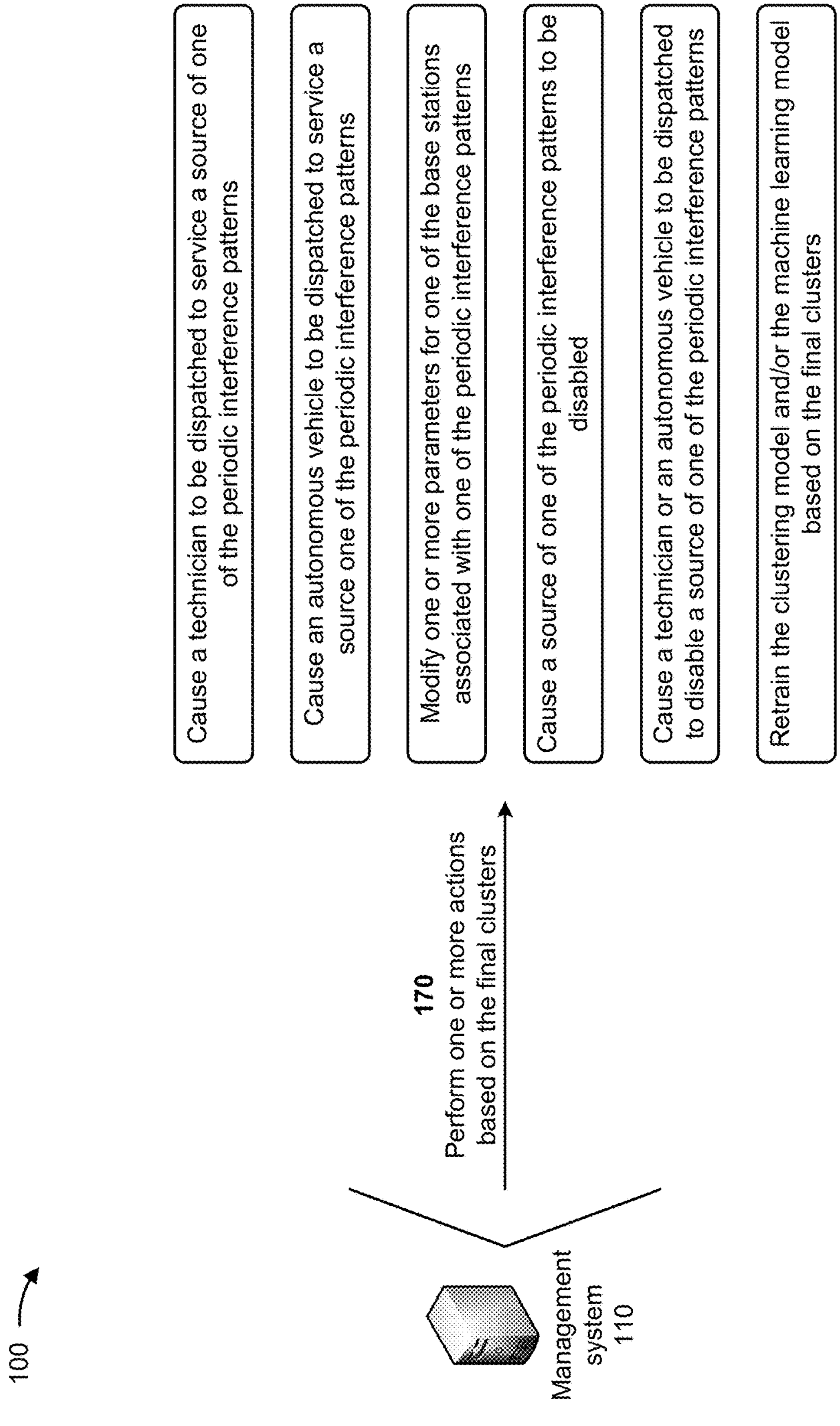

As shown in FIG. 1L, and by reference number 170, the management system 110 may perform one or more actions based on the final clusters. In some implementations, performing the one or more actions includes the management system 110 causing a technician to be dispatched to service a source of one of the periodic interference patterns. For example, the management system 110 may provide, to a technician (e.g., a UE of the technician), a notification identifying a source of one of the periodic interference patterns, a location of the source of one of the periodic interference patterns, directions to the source of one of the periodic interference patterns, and/or the like. The technician may utilize the notification to travel to the source of one of the periodic interference patterns and attempt to eliminate or service one of the periodic interference patterns. In this way, the management system 110 may conserve computing resources, networking resources, and/or other resources that would have otherwise been consumed by degrading call success rates for UEs based on periodic interference.

In some implementations, performing the one or more actions includes the management system 110 causing an autonomous vehicle to be dispatched to service a source of one of the periodic interference patterns. For example, the management system 110 may provide, to an autonomous vehicle (e.g., a drone, a robot, and/or the like), instructions identifying a source of one of the periodic interference patterns, a location of the source of one of the periodic interference patterns, directions to the source of one of the periodic interference patterns, actions to perform on the source one of the periodic interference patterns, and/or the like. The autonomous vehicle may utilize the instructions to travel to the source of one of the periodic interference patterns and attempt to eliminate or service the one of the periodic interference patterns. In this way, the management system 110 may conserve computing resources, networking resources, and/or other resources that would have otherwise been consumed by increasing dropped calls for UEs based on periodic interference.

In some implementations, performing the one or more actions includes the management system 110 modifying one or more parameters for one of the base stations 105 associated with one of the periodic interference patterns. For example, the management system 110 may identify a base station 105 associated with the one of the periodic interference patterns, and may determine parameters of the base station 105 to modify when the one of the periodic interference patterns is present (e.g., adjust an antenna angle, increase antenna power, and/or the like). The management system 110 may instruct the base station 105 to modify the parameters when the one of the periodic interference patterns is present. In this way, the management system 110 may conserve computing resources, networking resources, and/or other resources that would have otherwise been consumed by providing poor voice quality for UEs based on periodic interference, providing reduced data throughput for UEs based on periodic interference, dispatching technicians to unsuccessfully identify and/or locate sources of periodic interference, and/or the like.

In some implementations, performing the one or more actions includes the management system 110 causing a source of one of the periodic interference patterns to be disabled. For example, the management system 110 may determine that the source of the one of the periodic interference patterns is a network device controlled by the management system 110, and that the network device is malfunctioning. The management system 110 may cause the malfunctioning network device to be disabled to cause the one of the periodic interference patterns to cease. In this way, the management system 110 may conserve computing resources, networking resources, and/or other resources that would have otherwise been consumed by degrading call success rates for UEs based on periodic interference, increasing dropped calls for UEs based on periodic interference, and/or the like.

In some implementations, performing the one or more actions includes the management system 110 causing a technician or an autonomous vehicle to be dispatched to disable a source of one of the periodic interference patterns. For example, the management system 110 may determine that the source of the one of the periodic interference patterns is a network device controlled by the management system 110, and that the network device is malfunctioning. The management system 110 may cause a technician or an autonomous vehicle to be dispatched to disable the malfunctioning network device and cause the one of the periodic interference patterns to cease. In this way, the management system 110 may conserve computing resources, networking resources, and/or other resources that would have otherwise been consumed by providing poor voice quality for UEs based on periodic interference, providing reduced data throughput for UEs based on periodic interference, and/or the like.

In some implementations, performing the one or more actions includes the management system 110 retraining the clustering model and/or the machine learning model based on the final clusters. For example, the management system 110 may utilize the final clusters as additional training data for retraining the clustering model and/or the machine learning model, thereby increasing the quantity of training data available for training the clustering model and/or the machine learning model. Accordingly, the management system 110 may conserve computing resources associated with identifying, obtaining, and/or generating historical data for training the clustering model and/or the machine learning model relative to other systems for identifying, obtaining, and/or generating historical data for training machine learning models.

In this way, the management system 110 dynamically determines abnormal periodic signals in a network. For example, the management system 110 may accurately detect abnormal periodic signals in uplink noise (e.g., PRB data) of a network. The management system 110 may calculate a seasonal strength of the PRB data, may apply a filter to the PRB data, and may perform an FFT composite analysis of the PRB data. The management system 110 may calculate an FFT z-score that enables outlier amplification of individual FFT periods, and may cluster FFT periods. The management system 110 may detect peaks in the PRB data, may select a clustering parameter for the peaks, and may cluster the peaks based on the cluster parameter. Thus, the management system 110 may conserve computing resources, networking resources, and/or other resources that would have otherwise been consumed by degrading call success rates for UEs based on periodic interference, increasing dropped calls for UEs based on periodic interference, providing poor voice quality for UEs based on periodic interference, providing reduced data throughput for UEs based on periodic interference, dispatching technicians to unsuccessfully identify and/or locate sources of periodic interference, and/or the like.

As indicated above, FIGS. 1A-1L are provided as an example. Other examples may differ from what is described with regard to FIGS. 1A-1L. The number and arrangement of devices shown in FIGS. 1A-1L are provided as an example. In practice, there may be additional devices, fewer devices, different devices, or differently arranged devices than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
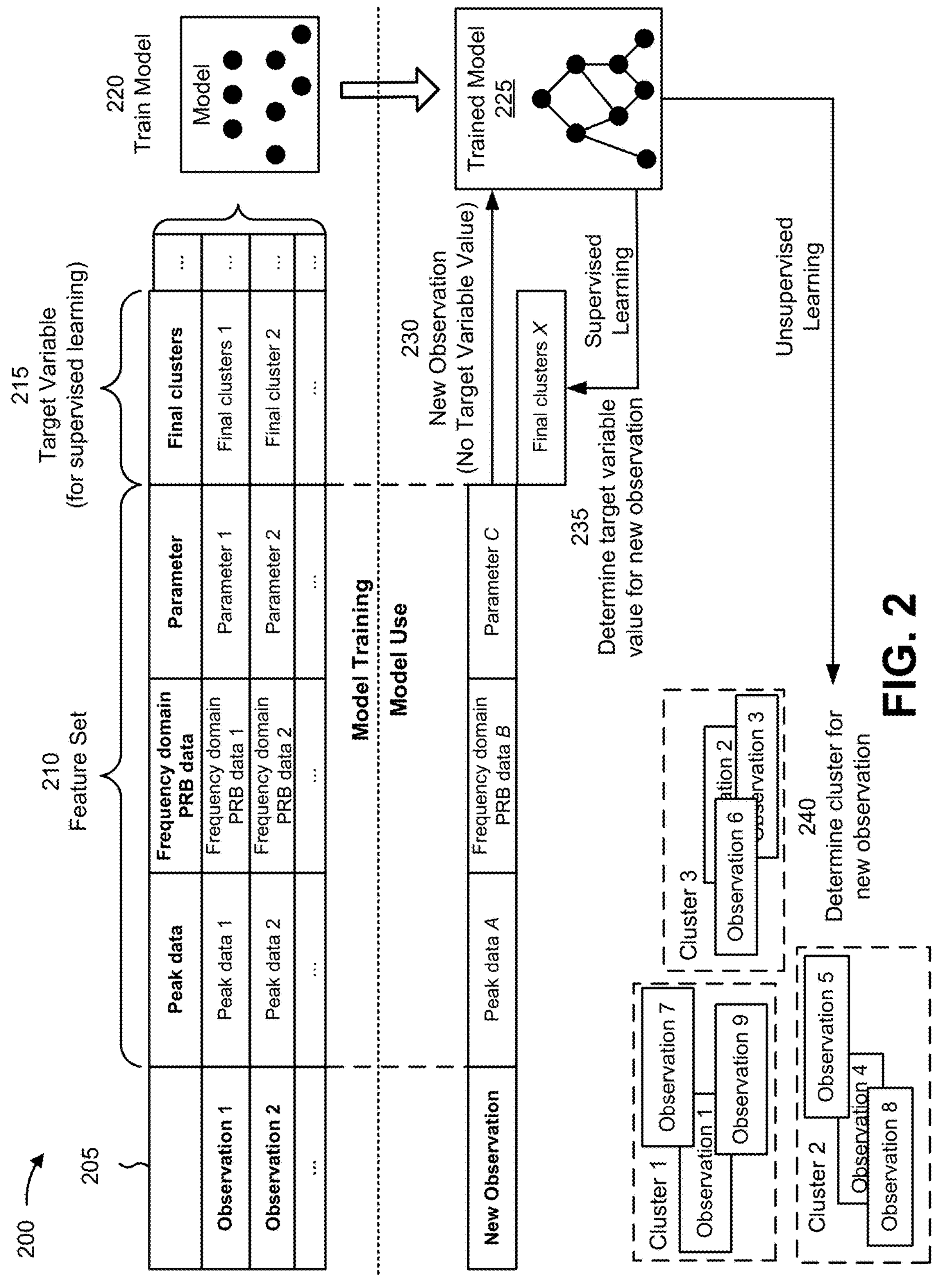
FIG. 2 is a diagram illustrating an example of training and using a machine learning model in connection with dynamically determining abnormal periodic signals in a network.

FIG. 2 is a diagram illustrating an example 200 of training and using a machine learning model in connection with dynamically determining abnormal periodic signals in a network. The machine learning model training and usage described herein may be performed using a machine learning system. The machine learning system may include or may be included in a computing device, a server, a cloud computing environment, or the like, such as the management system 110, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the base stations 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the base stations 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of peak data, a second feature of frequency domain PRB data, a third feature of a parameter for clustering, and so on. As shown, for a first observation, the first feature may have a value of peak data 1, the second feature may have a value of frequency domain PRB data 1, the third feature may have a value of parameter 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is final clusters, which has a value of final clusters 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of peak data A, a second feature of time domain PRB data B, a third feature of parameter C, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of final clusters X for the target variable of final clusters for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first periodic interference patterns cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second periodic interference patterns cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to dynamically determine abnormal periodic signals in a network. The machine learning system enables recognition and/or identification of tens, hundreds, thousands, or millions of features and/or feature values for tens, hundreds, thousands, or millions of observations, thereby increasing accuracy and consistency and reducing delay associated with dynamically determining abnormal periodic signals in a network relative to requiring computing resources to be allocated for tens, hundreds, or thousands of operators to manually determine abnormal periodic signals in a network using the features or feature values.

As indicated above, FIG. 2 is provided as an example. Other examples may differ from what is described in connection with FIG. 2.

Figure 3:
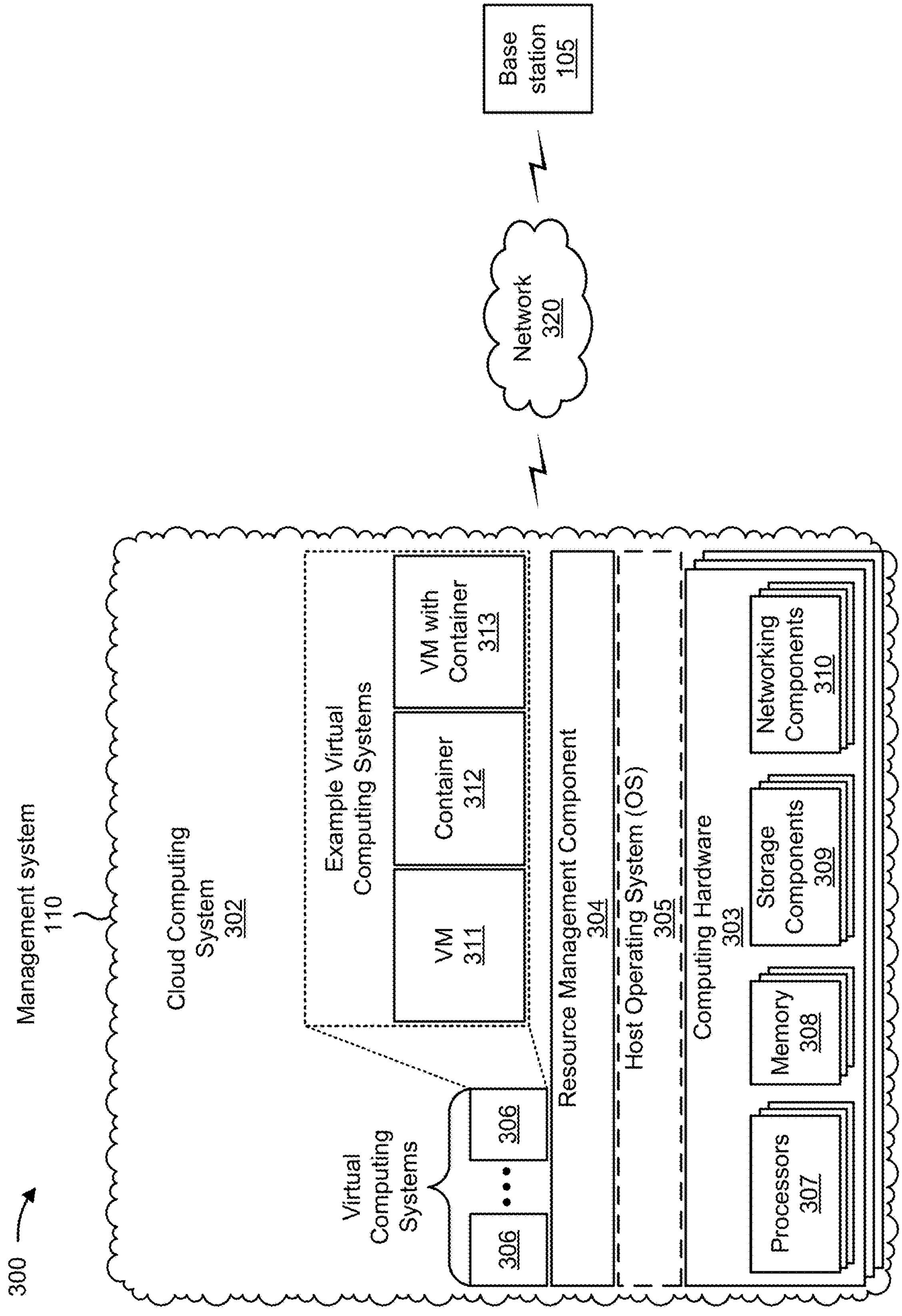
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the management system 110, which may include one or more elements of and/or may execute within a cloud computing system 302. The cloud computing system 302 may include one or more elements 303-313, as described in more detail below. As further shown in FIG. 3, the environment 300 may include the base station 105 and/or a network 320. Devices and/or elements of the environment 300 may interconnect via wired connections and/or wireless connections.

The base station 105 includes one or more devices capable of transferring traffic, such as audio, video, text, and/or other traffic, destined for and/or received from a UE. For example, the base station 105 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 105 may support, for example, a cellular radio access technology (RAT). The base station 105 may transfer traffic between a UE (e.g., using a cellular RAT), one or more other base stations 105 (e.g., using a wireless interface or a backhaul interface, such as a wired backhaul interface), and/or a core network. The base station 105 may provide one or more cells that cover geographic areas.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the management system 110 may include one or more elements 303-313 of the cloud computing system 302, may execute within the cloud computing system 302, and/or may be hosted within the cloud computing system 302, in some implementations, the management system 110 may not be cloud-based (e.g., may be implemented outside of a cloud computing system) or may be partially cloud-based. For example, the management system 110 may include one or more devices that are not part of the cloud computing system 302, such as the device 400 of FIG. 4, which may include a standalone server or another type of computing device. The management system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
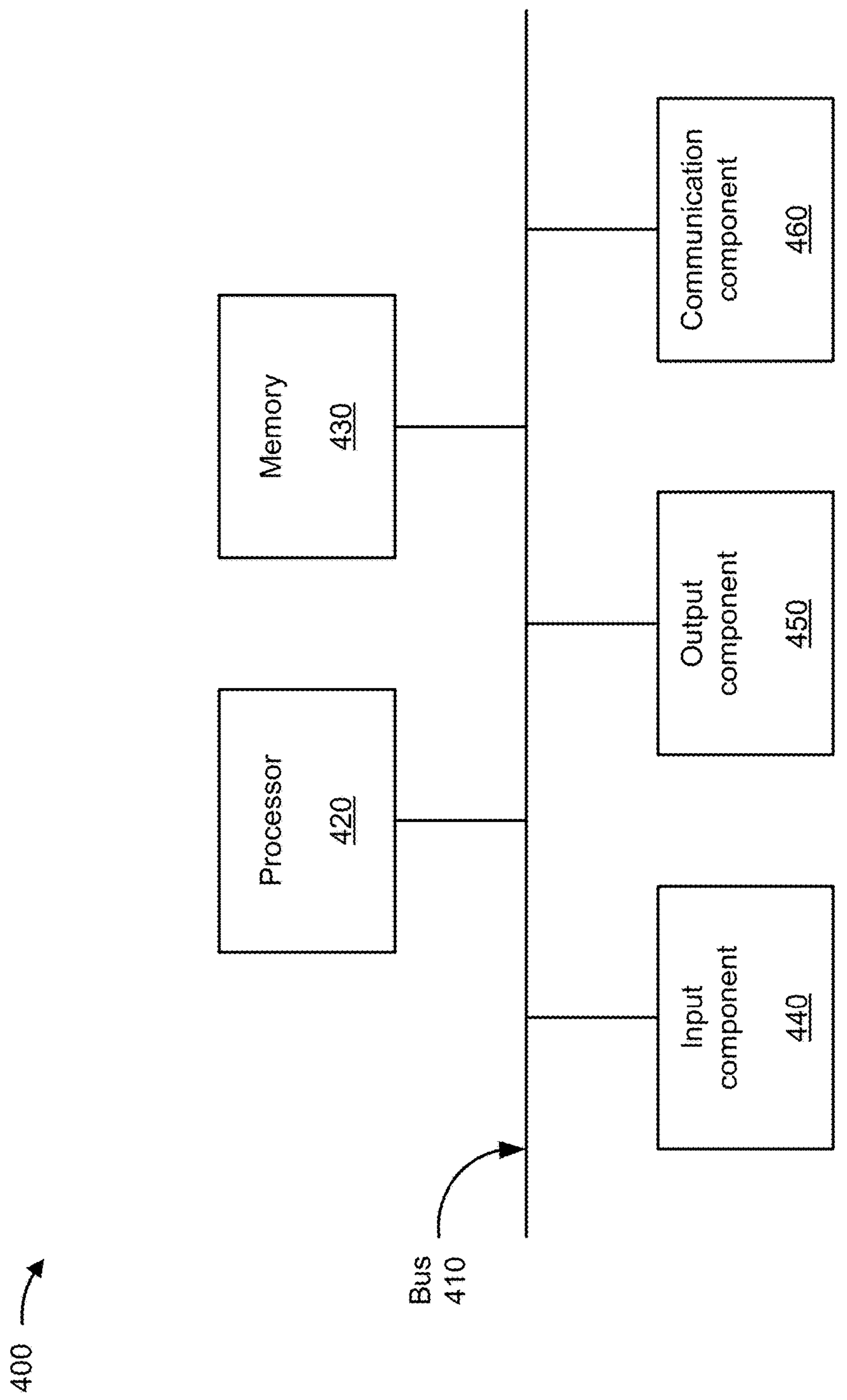
FIG. 4 is a diagram of example components of one or more devices of FIG. 3

FIG. 4 is a diagram of example components of a device 400, which may correspond to the base station 105 and/or the management system 110. In some implementations, the base station 105 and/or the management system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
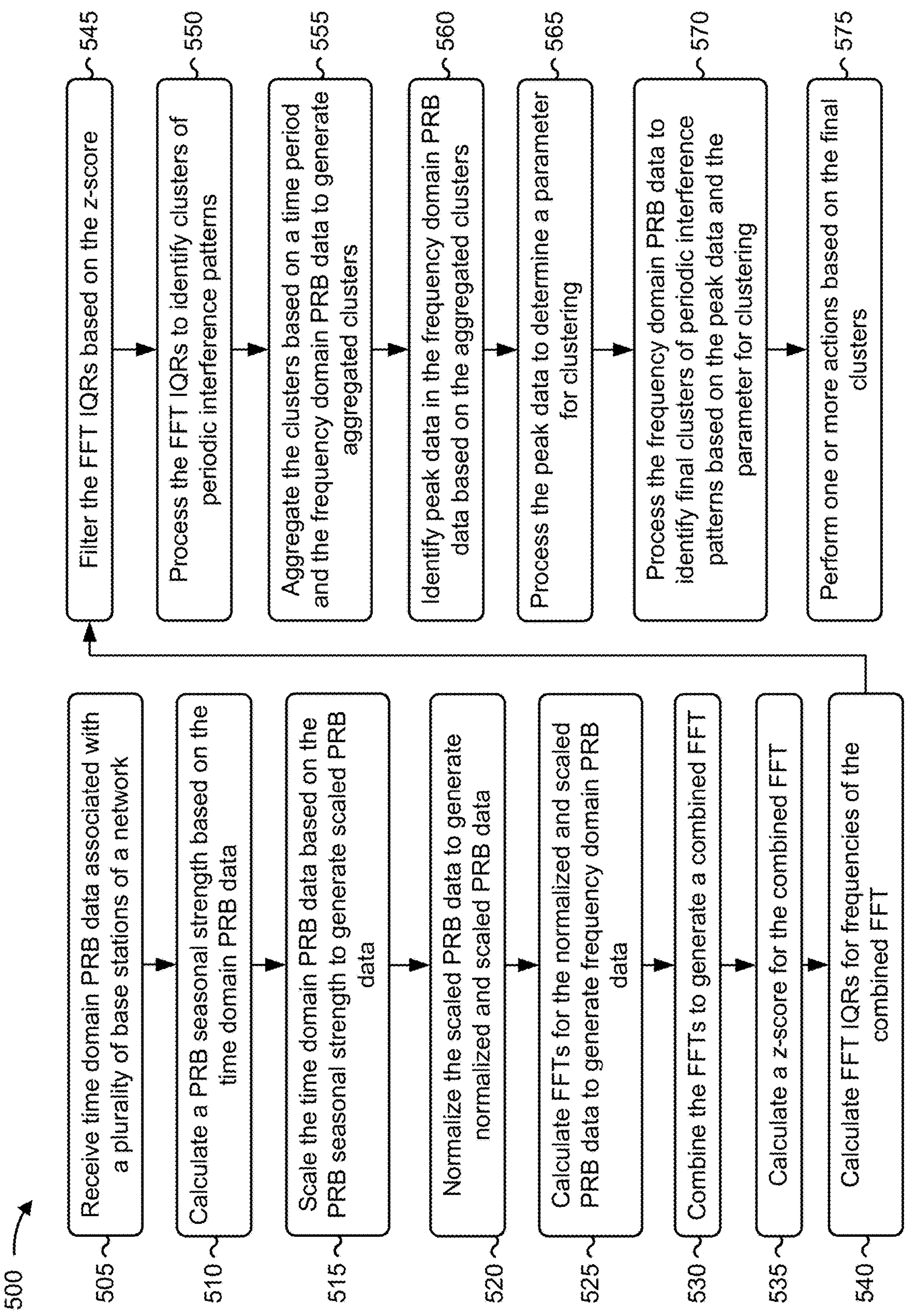
FIG. 5 is a flowchart of an example process for dynamically determining abnormal periodic signals in a network.

FIG. 5 is a flowchart of an example process 500 for dynamically determining abnormal periodic signals in a network. In some implementations, one or more process blocks of FIG. 5 may be performed by a device (e.g., the management system 110). In some implementations, one or more process blocks of FIG. 5 may be performed by another device or a group of devices separate from or including the device, such as a base station (e.g., the base station 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving time domain PRB data associated with a plurality of base stations of a network (block 505). For example, the device may receive time domain PRB data associated with a plurality of base stations of a network, as described above.

As further shown in FIG. 5, process 500 may include calculating a PRB seasonal strength based on the time domain PRB data (block 510). For example, the device may calculate a PRB seasonal strength based on the time domain PRB data, as described above.

As further shown in FIG. 5, process 500 may include scaling the time domain PRB data based on the PRB seasonal strength to generate scaled PRB data (block 515). For example, the device may scale the time domain PRB data based on the PRB seasonal strength to generate scaled PRB data, as described above.

As further shown in FIG. 5, process 500 may include normalizing the scaled PRB data to generate normalized and scaled PRB data (block 520). For example, the device may normalize the scaled PRB data to generate normalized and scaled PRB data, as described above.

As further shown in FIG. 5, process 500 may include calculating FFTs for the normalized and scaled PRB data and to generate frequency domain PRB data (block 525). For example, the device may calculate FFTs for the normalized and scaled PRB data and to generate frequency domain PRB data, as described above.

As further shown in FIG. 5, process 500 may include combining the FFTs to generate a combined FFT (block 530). For example, the device may combine the FFTs to generate a combined FFT, as described above. In some implementations, the combined FFT is a three-dimensional array of the FFTs.

As further shown in FIG. 5, process 500 may include calculating a z-score for the combined FFT (block 535). For example, the device may calculate a z-score for the combined FFT, as described above.

As further shown in FIG. 5, process 500 may include calculating FFT IQRs for frequencies of the combined FFT (block 540). For example, the device may calculate FFT IQRs for frequencies of the combined FFT, as described above.

As further shown in FIG. 5, process 500 may include filtering the FFT IQRs based on the z-score (block 545). For example, the device may filter the FFT IQRs based on the z-score, as described above.

As further shown in FIG. 5, process 500 may include processing the FFT IQRs to identify clusters of periodic interference patterns (block 550). For example, the device may process the FFT IQRs to identify clusters of periodic interference patterns, as described above. In some implementations, processing the FFT IQRs to identify the clusters of periodic interference patterns includes processing the FFT IQRs, with a k-nearest neighbor model, to determine neighboring periodic interference patterns, and performing a cross-correlation of the neighboring periodic interference patterns to identify the clusters of periodic interference patterns. In some implementations, processing the FFT IQRs to identify the clusters of periodic interference patterns includes processing the FFT IQRs, with a clustering model, to identify the clusters of periodic interference patterns based on FFT periods and PRB numbers.

As further shown in FIG. 5, process 500 may include aggregating the clusters based on a time period and the frequency domain PRB data to generate aggregated clusters (block 555). For example, the device may aggregate the clusters based on a time period and the frequency domain PRB data to generate aggregated clusters, as described above.

As further shown in FIG. 5, process 500 may include identifying peak data in the frequency domain PRB data based on the aggregated clusters (block 560). For example, the device may identify peak data in the frequency domain PRB data based on the aggregated clusters, as described above.

As further shown in FIG. 5, process 500 may include processing the peak data to determine a parameter for clustering (block 565). For example, the device may process the peak data to determine a parameter for clustering, as described above.

As further shown in FIG. 5, process 500 may include processing the frequency domain PRB data to identify final clusters of periodic interference patterns based on the peak data and the parameter for clustering (block 570). For example, the device may process the frequency domain PRB data to identify final clusters of periodic interference patterns based on the peak data and the parameter for clustering, as described above.

As further shown in FIG. 5, process 500 may include performing one or more actions based on the final clusters (block 575). For example, the device may perform one or more actions based on the final clusters, as described above. In some implementations, performing the one or more actions includes one or more of causing a technician to be dispatched to service a source of one of the periodic interference patterns, causing an autonomous vehicle to be dispatched to service a source of one of the periodic interference patterns, or modifying one or more parameters for one of the plurality of base stations associated with one of the periodic interference patterns. In some implementations, performing the one or more actions includes causing a technician or an autonomous vehicle to be dispatched to disable a source of one of the periodic interference patterns. In some implementations, performing the one or more actions includes one or more of causing a source of one of the periodic interference patterns to be disabled, or retraining the clustering model or the machine learning model based on the final clusters.

In some implementations, process 500 includes collapsing branch data of the time domain PRB data prior to calculating the PRB seasonal strength, and cleaning the time domain PRB data prior to calculating the PRB seasonal strength. In some implementations, process 500 includes applying an outlier amplifier to reduce noise in the scaled PRB data. In some implementations, process 500 includes applying an outlier amplifier to reduce noise in the combined FFT. In some implementations, process 500 includes one or more of providing the periodic interference patterns for display, or providing the final clusters of periodic interference patterns for display. In some implementations, process 500 includes applying a filter to the normalized and scaled PRB data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known “opt-in” or “opt-out” processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, time domain physical resource block (PRB) data associated with a plurality of base stations of a network;

calculating, by the device, a PRB seasonal strength based on the time domain PRB data;

scaling, by the device, the time domain PRB data based on the PRB seasonal strength to generate scaled PRB data;

normalizing, by the device, the scaled PRB data to generate normalized and scaled PRB data;

calculating, by the device, fast Fourier transforms (FFTs) for the normalized and scaled PRB data to generate frequency domain PRB data;

combining, by the device, the FFTs to generate a combined FFT;

calculating, by the device, a z-score for the combined FFT;

calculating, by the device, FFT interquartile ranges (IQRs) for frequencies of the combined FFT;

filtering, by the device, the FFT IQRs based on the z-score;

processing, by the device, the FFT IQRs to identify clusters of periodic interference patterns;

aggregating, by the device, the clusters of periodic interference patterns based on a time period and the frequency domain PRB data to generate aggregated clusters;

identifying, by the device, peak data in the frequency domain PRB data based on the aggregated clusters;

processing, by the device, the peak data to determine a parameter for clustering;

processing, by the device, the frequency domain PRB data to identify final clusters of periodic interference patterns based on the peak data and the parameter for clustering; and performing, by the device, one or more actions based on the final clusters of periodic interference patterns, wherein performing the one or more actions comprises modifying one or more parameters for one of the plurality of base stations associated with one of the periodic interference patterns.

2. The method of claim 1, further comprising:

collapsing branch data of the time domain PRB data prior to calculating the PRB seasonal strength; and cleaning the time domain PRB data prior to calculating the PRB seasonal strength.

3. The method of claim 1, further comprising:

applying an outlier amplifier to reduce noise in the scaled PRB data.

4. The method of claim 1, further comprising:

applying an outlier amplifier to reduce noise in the combined FFT.

5. The method of claim 1, further comprising one or more of:

providing the periodic interference patterns for display; or providing the final clusters of periodic interference patterns for display.

6. The method of claim 1, wherein the combined FFT is a three-dimensional array of the FFTs.

7. The method of claim 1, wherein processing the FFT IQRs to identify the clusters of periodic interference patterns comprises:

processing the FFT IQRs, with a k-nearest neighbor model, to determine neighboring periodic interference patterns; and performing a cross-correlation of the neighboring periodic interference patterns to identify the clusters of periodic interference patterns.

8. A device, comprising:

one or more processors configured to:

calculate a physical resource block (PRB) seasonal strength based on time domain PRB data associated with a plurality of base stations of a network;

scale the time domain PRB data based on the PRB seasonal strength to generate scaled PRB data;

normalize the scaled PRB data to generate normalized and scaled PRB data;

calculate fast Fourier transforms (FFTs) for the normalized and scaled PRB data to generate frequency domain PRB data;

combine the FFTs to generate a combined FFT;

calculate a z-score for the combined FFT;

calculate FFT interquartile ranges (IQRs) for frequencies of the combined FFT;

filter the FFT IQRs based on the z-score;

process the FFT IQRs, with a clustering model, to identify clusters of periodic interference patterns;

aggregate the clusters of periodic interference patterns based on a time period and the frequency domain PRB data to generate aggregated clusters;

identify peak data in the frequency domain PRB data based on the aggregated clusters;

process the peak data, with a machine learning model, to determine a parameter for clustering;

process the frequency domain PRB data, with the clustering model, to identify final clusters of periodic interference patterns based on the peak data and the parameter for clustering; and perform one or more actions based on the final clusters of periodic interference patterns, wherein performing the one or more actions comprises modifying one or more parameters for one of the plurality of base stations associated with one of the periodic interference patterns.

9. The device of claim 8, wherein the one or more processors are further configured to one or more of:

provide the periodic interference patterns for display; or provide the final clusters of periodic interference patterns for display.

10. The device of claim 8, wherein the one or more processors are further configured to:

apply a filter to the normalized and scaled PRB data.

11. The device of claim 8, wherein the one or more processors are configured to process the FFT IQRs, with the clustering model, to identify the clusters of periodic interference patterns based on FFT periods and PRB numbers.

12. The device of claim 8, wherein the one or more processors, to perform the one or more actions, are configured to one or more of:

cause a technician to be dispatched to service a source of one of the periodic interference patterns; or cause an autonomous vehicle to be dispatched to service a source of one of the periodic interference patterns.

13. The device of claim 8, wherein the one or more processors, to perform the one or more actions, are configured to:

cause a technician or an autonomous vehicle to be dispatched to disable a source of one of the periodic interference patterns.

14. The device of claim 8, wherein the one or more processors, to perform the one or more actions, are configured to one or more of:

cause a source of one of the periodic interference patterns to be disabled; or retrain the clustering model or the machine learning model based on the final clusters of periodic interference patterns.

15. A non-transitory computer-readable medium storing a set of instructions, the set of instructions comprising:

one or more instructions that, when executed by one or more processors of a device, cause the device to:

calculate a physical resource block (PRB) seasonal strength based on time domain PRB data associated with a plurality of base stations of a network;

scale and normalize the time domain PRB data based on the PRB seasonal strength to generate normalized and scaled PRB data;

calculate fast Fourier transforms (FFTs) for the normalized and scaled PRB data to generate frequency domain PRB data;

combine the FFTs to generate a combined FFT;

calculate a z-score for the combined FFT;

calculate FFT interquartile ranges (IQRs) for frequencies of the combined FFT;

filter the FFT IQRs based on the z-score;

process the FFT IQRs, with a clustering model, to identify clusters of periodic interference patterns;

aggregate the clusters of periodic interference patterns based on a time period and the frequency domain PRB data to generate aggregated clusters;

identify peak data in the frequency domain PRB data based on the aggregated clusters;

process the peak data, with a machine learning model, to determine a parameter for clustering;

process the frequency domain PRB data, with the clustering model, to identify final clusters of periodic interference patterns based on the peak data and the parameter for clustering; and perform one or more actions based on the final clusters of periodic interference patterns, wherein performing the one or more actions comprises modifying one or more parameters for one of the plurality of base stations associated with one of the periodic interference patterns.

16. The non-transitory computer-readable medium of claim 15, wherein the one or more instructions further cause the device to:

collapse branch data of the time domain PRB data prior to calculating the PRB seasonal strength; and clean the time domain PRB data prior to calculating the PRB seasonal strength.

17. The non-transitory computer-readable medium of claim 15, wherein the one or more instructions further cause the device to:

apply an outlier amplifier to reduce noise in the scaled PRB data.

18. The non-transitory computer-readable medium of claim 15, wherein the one or more instructions further cause the device to:

apply an outlier amplifier to reduce noise in the combined FFT.

19. The non-transitory computer-readable medium of claim 15, wherein the one or more instructions that cause the device to process the FFT IQRs, with the clustering model, to identify the clusters of periodic interference patterns, cause the device to:

process the FFT IQRs, with a k-nearest neighbor model, to determine neighboring periodic interference patterns; and perform a cross-correlation of the neighboring periodic interference patterns to identify the clusters of periodic interference patterns.

20. The non-transitory computer-readable medium of claim 15, wherein the one or more instructions further cause the device to:

apply a filter to the normalized and scaled PRB data.

* * * * *